United States Patent
Morohashi et al.

(10) Patent No.: US 6,387,306 B1
(45) Date of Patent: May 14, 2002

(54) DEAERATION OF FEED MATERIALS IN AN EXTRUSION PROCESS

(75) Inventors: Hiroshi Morohashi, Hino; Kanji Shinguu, Yao; Hiroo Kojima, Tokyo, all of (JP)

(73) Assignee: Hiroshi Morohashi, Hino (JP)

( * ) Notice: Subject to any disclaimer, the term of this patent is extended or adjusted under 35 U.S.C. 154(b) by 0 days.

(21) Appl. No.: 09/242,169

(22) PCT Filed: Jul. 13, 1998

(86) PCT No.: PCT/JP98/03130

§ 371 Date: Feb. 10, 1999

§ 102(e) Date: Feb. 10, 1999

(87) PCT Pub. No.: WO99/03660

PCT Pub. Date: Jan. 28, 1999

(30) Foreign Application Priority Data

Jul. 18, 1997 (JP) .............................. 9-193462
Apr. 24, 1998 (JP) ........................... 10-115503

(51) Int. Cl.⁷ .......................... B29C 47/76; B29C 47/10
(52) U.S. Cl. .................... 264/102; 264/211.21; 366/75; 366/139; 425/113; 425/812
(58) Field of Search .............................. 264/102, 176.1, 264/211.21; 425/113, 114, 130, 131.1, 132, 203, 812, DIG. 16, DIG. 20; 366/75, 139

(56) References Cited

U.S. PATENT DOCUMENTS 4,125,208 A * 11/1978 Bettermann ................. 222/152
4,142,040 A    2/1979 Jabarin et al.

FOREIGN PATENT DOCUMENTS

| GB | 2270029 A | * | 2/1994 |
| JP | 50-86568 | | 7/1975 |
| JP | 59-323 | | 1/1984 |
| JP | 63-139706 | | 6/1988 |
| JP | 5-413 | | 1/1993 |
| JP | 5-42533 | | 2/1993 |
| JP | 6-190891 | | 7/1994 |
| JP | 8-258041 | | 10/1996 |
| JP | 8-281766 | | 10/1996 |

OTHER PUBLICATIONS

Patent Abstracts of Japan, vol. 010, No. 267 (M–516), Sep. 11, 1996 & JP 61–092811 A (Tokan Kogyo Co., Ltd.), May 1, 1986.

* cited by examiner

Primary Examiner—Mark Eashoo
(74) Attorney, Agent, or Firm—Kanesaka & Takeuchi (57) ABSTRACT

In a method for molding a raw material including a plastic material or a mixture of plastic and non-plastic materials fed into a cylinder, the said raw material is subjected to a melt-kneading performed under oxygen-free conditions, and at the same time the molten material is sent from the tip of an extrusion screw towards the head section of the cylinder in straight flow conditions. In the method satisfactory molding can be made for plastics of poor fluidity or thermal stability or for plastic materials mixed with more than 10 to 30% by weight of wood flour, paper powders, stone powders, metal powders, fiber reinforcements and the like, without causing molding defects such as burn or cavitation; and also for raw materials mixed with more than several per cent by weight of metal powders or stone powders without causing excessive wear at the extrusion screw.

14 Claims, 5 Drawing Sheets

DEAERATION OF FEED MATERIALS IN AN EXTRUSION PROCESS

TECHNICAL FIELD

The present invention relates to a method for molding plastics and other materials. More specifically, the present invention relates to a molding method suitable for application in molding materials having poor fluidity or thermal stability, which typically can include plastic materials such as polyethylene and others having ultra-high molecular weight, or mixtures of plastic materials such as polyvinyl chloride and non-plastic materials such as wood flour, paper powders, stone powders, metal powders, fiber reinforcements, and the like.

BACKGROUND ART

In the field of technologies for molding plastics, numerous improvements have been proposed and implemented to bring about remarkable progress in the related area.

In Japanese Patent Application Laid-Open No. 190891/1994, the present inventor has proposed a molding technique for plastic materials wherein the production rate and quality of the molded products can be improved by increasing bulk density of the raw material within the extrusion cylinder.

On the other hand, in line with requirements related to diversification and recycled use of plastic moldings in recent years, new products have emerged and are used in applications such as building materials, examples of which include molded products of wood-like appearance using raw materials comprising mixtures of plastic materials and wood flour, or molded products of marble-like appearance using raw materials comprising mixtures of plastic materials and marble stone powders.

In the prior art, however, molded products having wood-like appearance comprising mixtures of plastic materials and wood flour, or those comprising mixtures of plastic materials and marble stone powders lacked the appearance and tactility of genuine wood or marble and therefore were unable to offer higher commercial values because the mixing ratios of wood flour or stone powders to the plastic materials were limited typically to a level less than 20 to 30% by weight.

The reason that the mixing ratios of wood flour or stone powders must be limited to a level less than 20 to 30% by weight as above is that, raw materials comprising plastic materials mixed with 20 to 30% by weight or more of non-plastic materials such as wood flour or stone powders typically exhibit reduced fluidity and thermal stability when an extrusion molding is performed on them. This in turn causes an overheating of the non-plastic materials contained in the raw material, leading to carbonization and a phenomenon so-called "burn" in the molded products. This phenomenon can occur in a similar fashion on raw materials comprising plastic materials mixed with more than 30% by weight of paper powders.

Meanwhile, in the case of raw materials having poor fluidity or thermal stability, the molded products sometimes develop cavities within them (i.e. "cavitation"), even though there were no burn-related problems.

Such phenomena as burn or cavitation above have also been experienced when a plastic material of poor fluidity or thermal stability is used alone.

Furthermore, when a molding operation is performed on materials mixed with 5% by weight or more of stone powders or those mixed with more than several percent by weight of metal powders using a conventional extruding machine, wear on the extrusion screw can become excessive, particularly at its tip portion, requiring a frequent replacement of the screw at an increased cost of operation.

As a result of extensive research conducted with a view to eliminating aforementioned problems, the present inventor has found that a smooth and high quality molding operation can be made available for plastic materials of poor fluidity or thermal stability, or for raw materials based on plastic materials mixed with non-plastic materials such as wood flour, paper powders, stone powders, metal powders, or fiber reinforcements at ratios higher than that conventionally applied, by carrying out melt-kneading of raw materials under oxygen-free conditions, shortening melt-kneading time duration, feeding raw materials from the screw tip in straight flow conditions, and/or reducing the shearing force working at the screw tip material.

The present invention has been made in this situation and has an object of providing a method for performing satisfactory molding for plastics having poor fluidity or thermal stability or for plastic materials mixed with more than 10 to 30% by weight of wood flour, paper powders, stone powders, metal powders, fiber reinforcements, and the like, without causing molding defects such as burn or cavitation, and also for raw materials mixed with more than several percent by weight of metal powders or stone powders without causing excessive wear at the extrusion screw.

DISCLOSURE OF THE INVENTION

In accordance with the method for molding plastics and other materials of the present invention, a raw material comprising a plastic material or a mixture of plastic and non-plastic materials is fed into a cylinder wherein said raw material is subjected to a melt-kneading performed under oxygen-free conditions.

One example of the possible methods for providing oxygen-free conditions for a raw material comprises feeding the raw material from a hopper into a cylinder through a valve, a connecting tube, and an opening to the cylinder while the raw material is subjected to deaeration as it travels through the path from said valve to said cylinder and, at the same time, effecting an additional deaeration in the vicinity of the opening to said cylinder with a suction force equal to or greater than that applied for the deaeration provided in the path from said valve to said cylinder, thereby achieving the desired oxygen-free conditions for the raw material. It is more desirable if the above hopper is hermetically sealed and, furthermore, feeding of raw materials to said hopper is provided alternately from a plurality of sub-hoppers that are also hermetically sealed.

Since the above-described method helps hinder oxidative phenomena occurring within the cylinder, carbonization of the raw material can be minimized and therefore the burn defects in the molded products can be avoided.

Furthermore, in the method for molding plastics and other materials according to the present invention, it is desirable to feed a molten raw material from the tip of the screw to the head section of the cylinder while maintaining straight flow conditions. As a specific means to feed a raw material to the head section of the cylinder in straight flow conditions, use of a screw having a tip angle of from 30 to 120 degrees can be given, by way of an example.

An arrangement for the screw tip angle such as described above enables to eliminate burn defects occurring due to a part of the molten raw material being trapped in the swirl generated around the screw tip and flowing stagnantly, or cavitation defects caused due to starvation of the molten raw material occurring otherwise in the area around the center of the screw tip.

Moreover, to feed a molten resin to the head section of the cylinder in better straight flow conditions, it is desirable to reduce the shearing force working on the molten resin.

In the present specification, the passage "oxygen-free conditions for a raw material" refers to the conditions wherein gaseous substances such as air are removed from the raw material itself as well as from the interspaces held in the raw material bulk, thereby leaving only a small amount of oxygen remaining in it.

Also in the present specification, the word "molten" can sometimes refer to a semi-molten state in addition to a completely molten state.

Furthermore, in the present specification, the passage "straight flow conditions" (or so-called "plug flow") is defined as conditions wherein a molten raw material flows along the screw tip with an approximately equal flow velocity across the radial sections and without involving irregular flows such as a turbulent flow.

In the above-mentioned method for molding plastics and other materials, raw materials containing from 10 to 80% by weight of non-plastic materials are also included as the object of molding, as well as raw materials comprising plastic materials in either pellet or powder form and non-plastic, powder form materials, both being fed from hoppers.

The equipment for molding plastics and other materials according to the present invention is provided with a pair of hoppers and a main hopper mounted underneath them, a sealing valve connected to said hopper, a connecting tube placed between said sealing valve and an opening of a cylinder, primary suction holes provided on said connecting tube, a screw inserted in said cylinder, and secondary suction holes provided in the vicinity of the opening at the inner diameter wall of said cylinder, with a ratio of the cylinder length to the screw length being from 1:0.98 to 1:0.75.

In the above arrangement, it is more desirable to configure a plurality of sub-hoppers on top of the above-mentioned hopper, each being connected through a sealing valve.

A configuration such as described above enables feeding of raw materials into the hopper in a continuous mode while avoiding entraining air.

BRIEF DESCRIPTION OF THE DRAWINGS

FIGS. 3(a) and 3(b) are schematic diagrams illustrating the conditions of raw material being trapped and stagnant and also in a turbulent flow occurring when a screw having a tip angle greater than 120 degrees is used, whereas

BEST MODE FOR CARRYING OUT THE INVENTION

The mode for carrying out the present invention will be explained in more detail below.

First, a molding machine in one embodiment of the present invention is described referring to the drawings presented.

Figure 1:
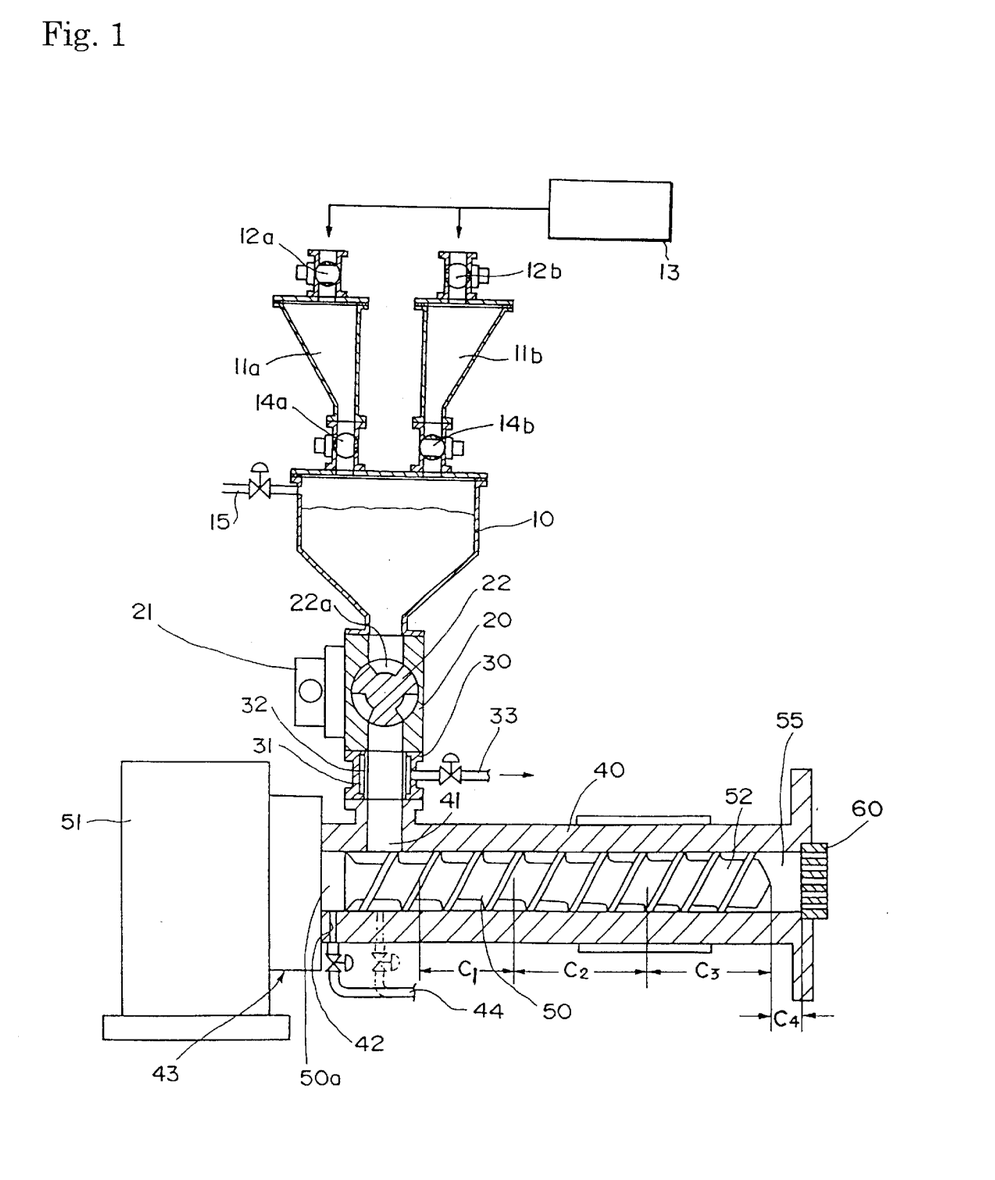
FIG. 1 shows a side sectional view of a molding machine in one embodiment of the present invention.

FIG. 1 shows a sectional view of the configuration of a molding machine in one embodiment of the present invention.

The equipment shown in the drawing has a hopper 10, a rotary valve(sealing valve, valve) 20, a connecting tube 30, a cylinder 40, and a screw 50.

The hopper 10 is equipped with two sub-hoppers 11a and 11b on its top, and the sub-hoppers 11a and 11b are connected to a raw material feeder 13 through ball valves 12a and 12b while at the same time connected to the hopper 10 via ball valves 14a and 14b.

Moreover, a suction tube 15 is connected to an upper part of the hopper 10 to evacuate air from the hopper 10.

When the raw material is fed from one of the sub-hoppers, 11a, into the hopper 10 in the above arrangement, the ball valve 12a located between the sub-hopper 11a and the raw material feeder 13 is closed, while at the same time the ball valve 14a located before the hopper 10 is opened. Concurrently, the ball valve 14b located between the other sub-hopper 11b and the hopper 10 is closed, while at the same time the ball valve 12b located after the raw material feeder 13 is opened to receive the raw material into the sub-hopper 11b.

The above-mentioned arrangement enables to limit the entrance of air into the hopper 10 at the time of receiving the raw material to a minimum, while maintaining the level of the raw material inside the hopper 10 roughly constant.

The hopper 10 meanwhile is connected to an opening 41 of the cylinder 40 through the rotary valve 20 and the connecting tube 30 attached underneath the rotary valve.

In the above arrangement, the rotary valve 20 is designed to feed the raw material from the hopper 10 to the connecting tube 30 by rotating a valve unit 22 with a driving motor 21, sending a constant quantity with each rotating movement, and also to prevent air remaining in the hopper 10 from flowing into the connecting tube 30 with its sealed structure.

The connecting tube 30 is furnished with primary suction holes 31 to remove air from the raw material flowing inside the connecting tube 30. The primary suction holes 31 are provided at all or a part of the inner circumference of the connecting tube 30 into a sunken shape, with the apertures furnished with a filter element 32.

The primary suction holes 31 are then connected through one or more of piping 33 (only one is shown in the drawing) to a suction pump not shown in the drawing.

The filter element 32, not shown in the drawing, is preferably configured with one to three mesh screens placed on a holder made of a metal plate having punched perforations. A desirable aperture rate for the mesh screen holder to be used in the filter element 32 is from 60% to 90%.

Also, a desirable pore size of the mesh screens to be used in the filter element 32 is from 60 mesh to 100 mesh.

With the above-mentioned configuration, the amount of the raw material escaping through the suction holes together with air can be restricted to a minimum, while allowing efficient deaeration of the raw material.

The cylinder 40 has the screw 50 inserted therein, together with a breaker plate 60 (i.e. die) attached at its head.

At the bottom and/or near the bottom of the cylinder 40 facing the opening 41 are provided secondary suction holes 42 for deaeration of the raw material fed into the cylinder 40, and also for drawing and reversing the heat within the cylinder 40 back to the vicinity of the opening 41.

The location of the secondary suction holes 42 is not specifically restricted, as long as the raw materials are in the form of pellets with a relatively high bulk density. However, when the raw materials with a low bulk density, such as of a powder form, are used, it is preferable to locate the secondary suction holes 42 within 30 to 60 degrees on both sides of the lowest position of the cylinder 40, i.e. within a circumferential range of 60 to 120 degrees at the bottom section of the cylinder 40.

Figure 2A:
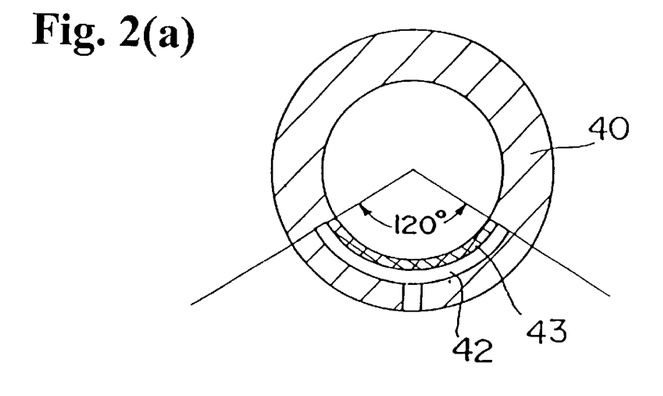
FIGS. 2(a) to 2(c) are schematic diagrams illustrating the manner in which the secondary suction holes are formed in one embodiment of the present invention.
Figure 2B:
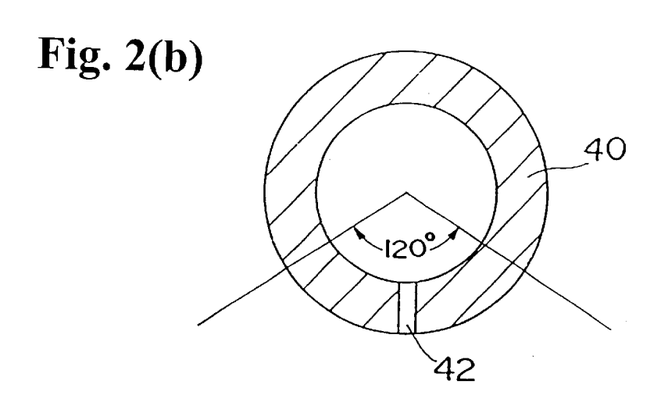
Figure 2C:
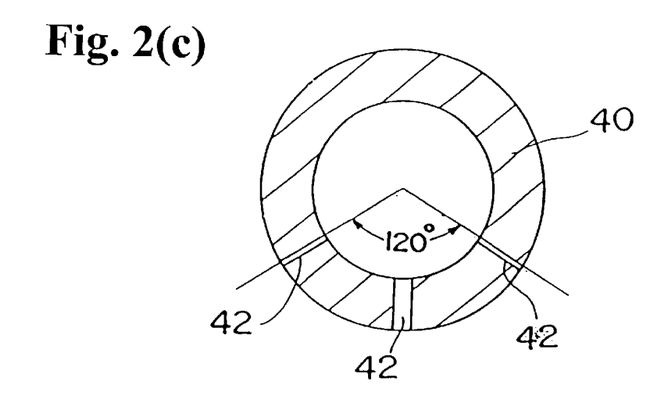

More specifically, possible arrangements for the secondary suction holes 42 include a hollow shaped suction hole 42 formed across the 120-degree circumferential range at the bottom section as shown in FIG. 2(a), a suction hole 42 formed only at the bottom location as shown in FIG. 2(b), and a plurality of suction holes 42 formed within a circumferential range of 60 to 120 degrees at the bottom section of the cylinder 40, as shown in FIG. 2(c).

In the above arrangement, a filter element 43 may be provided at the aperture of the suction hole 42 as shown in FIG. 2(a), or varied diameters may be used when a plurality of the suction holes 42 is formed as shown in FIG. 2(c).

Additionally, the secondary suction holes 42 are connected through piping 44 to a suction pump not shown in the drawing.

Performing deaeration through the secondary suction holes 42 provided at positions within the 120-degree circumferential range at the bottom section of the cylinder 40 as described above allows the raw material fed into the cylinder 40 to be attracted towards the bottom of the cylinder 40. This in turn enables a smooth supply of the raw material into the cylinder 40.

By contrast, if the secondary suction holes 42 are provided at positions outside of the 120-degree circumferential range at the bottom section of the cylinder 40, the raw material fed from the hopper into the cylinder 40 can be attracted to the inner diameter wall of the cylinder 40 near the opening 41 and accumulated nearby. This can interfere with the subsequent supply of the raw material into the cylinder 40, causing fluctuation or shortage of the feedstock supply and thereby leading to a lower productivity and inferior quality.

The screw 50 is rotated by a drive motor housed inside a drive unit 51 but not shown in the drawing, and works to melt and knead the raw material fed into the cylinder 40. In addition, the extruder of the present embodiment has a sealing section 43 to prevent the entrance of air from the driving unit 51 into the cylinder 40.

Figure 4:
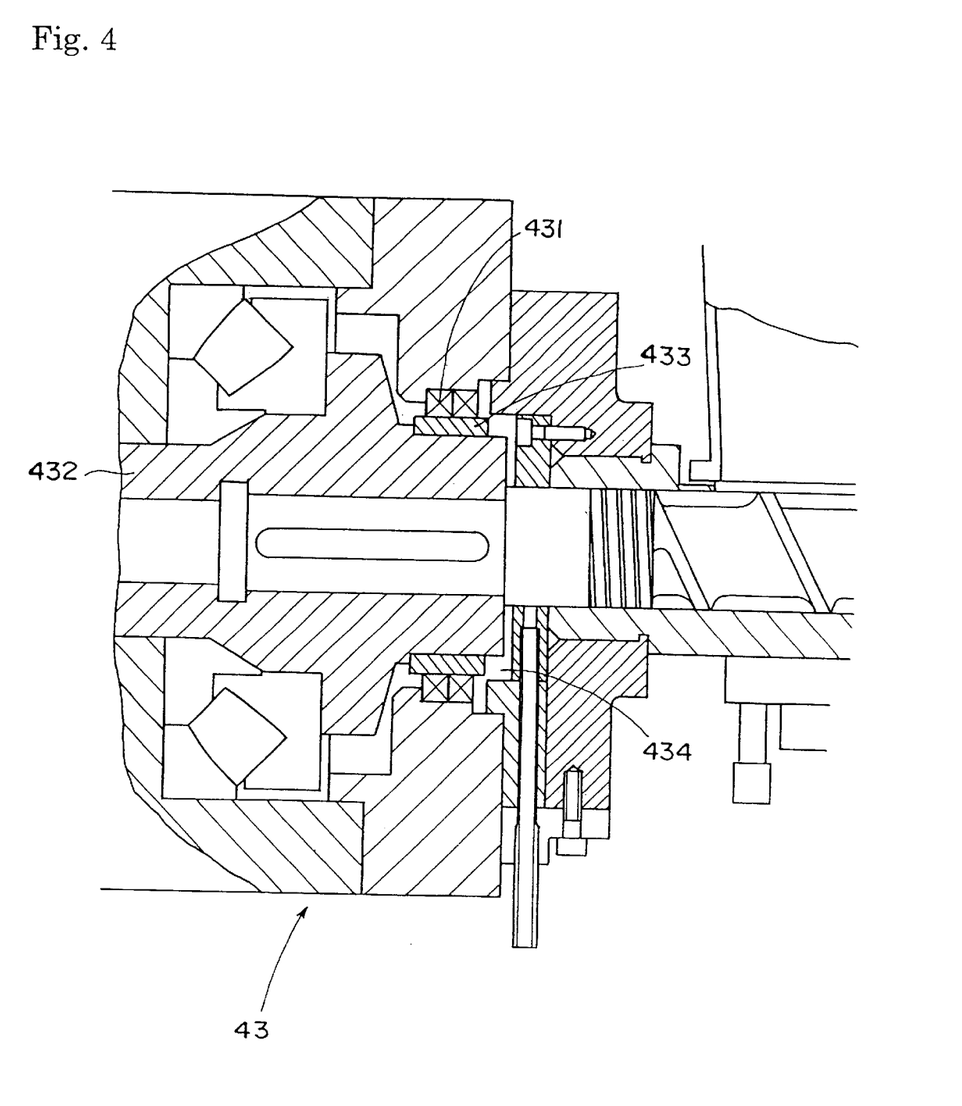
FIG. 4 shows an enlarged side sectional view of the sealing section of a molding machine according to the present invention.

Next, the sealing section 43 of the extruder of the present embodiment is described in detail.

FIG. 4 shows a cross-sectional view of the sealing section 43. As illustrated in the drawing, with the sealing section 43 of the present embodiment, an oil seal 431 is provided via a sliding shoe 433 at the outer circumference of a sleeve 432 for power transmission to which the root 50a of the screw 50 is inserted. The oil seal 431 is not placed directly on the outer circumference of the screw root 50a. The oil seal 431 is positioned closer to the driving unit 51 than the secondary suction holes 42 so that air does not flow from the driving unit 51 to the secondary suction holes 42.

The above arrangement allows an appropriate space 434 to be formed between the screw root 50a and the oil seal 431.

Locating the oil seal 431 at a position away from the screw root 50a as described above eliminates the chances for potential damages caused on the oil seal 431 by the raw material when the screw 50 is withdrawn from or inserted into the cylinder 40 for maintenance or other reasons. In other words, chances of such a damage arise when the screw 50 is withdrawn from the cylinder 40 allowing any raw material remaining in the connecting tube 30 to fall into the cylinder 40.

If the screw 50 is inserted back into the cylinder 40 in the above condition, the raw material inside the cylinder 40 is pushed by the screw root 50a towards the driving unit 51, thereby damaging an oil seal if this is positioned directly on the inner wall of the cylinder 40. A damaged oil seal inevitably allows an inflow of air from the driving unit 51 into the cylinder 40 to reduce the effectiveness of deaeration performed through the secondary suction holes 42.

However, with presence of the space 434 provided between the inner wall of the cylinder 40 and the oil seal 431 as in the sealing section 43 of the present embodiment, raw material that has fallen from the connecting tube 30 into the cylinder 40 is collected in the space 434 and is prevented from entering between the oil seal 431 and the sliding shoe 433. Consequently, the oil seal 431 can be kept intact and free from the damages by the raw material that have been experienced with a conventional machine when the screw is drawn from or inserted into the cylinder for maintenance or other reasons.

Note here that any raw material trapped in the space 434 is removed when the sealing section 43 is dismantled for withdrawing the screw 50, and therefore will not accumulate in the space 434.

Meanwhile, the screw 50 is designed shorter than the cylinder 40 to provide a space 55 in front of the tip of the screw 50. Specifically, the screw length is set at a ratio from 0.98 to 0.75 to 1.00 of the cylinder length, depending on products to be molded, to provide the space 55 on the breaker plate 60 (die) side of the cylinder 40 with approximately 2–25% of its total length.

The space 55 acts to reduce the shearing force working on the molten and kneaded raw material immediately before extrusion from the cylinder 40 so that unnecessary heating of the raw material can be prevented, as well as to reduce unevenness in the flow of the molten material (i.e. to improve the regularity of the straight flow), while lowering the material temperature to adjust the viscosity of the material to a level desired for the molding operation. This prevents oxidation which otherwise occurs when the materials are extruded under high temperature conditions, thereby ensuring production of high quality molded articles.

The size of the above-mentioned space 55 therefore is determined within the range specified in the above and according to the raw material to be molded, so that excessive frictional heat or uneven kneading is not caused by too narrow space 55 or, conversely, too much space will not make the kneading strength insufficient.

Figure 3A:
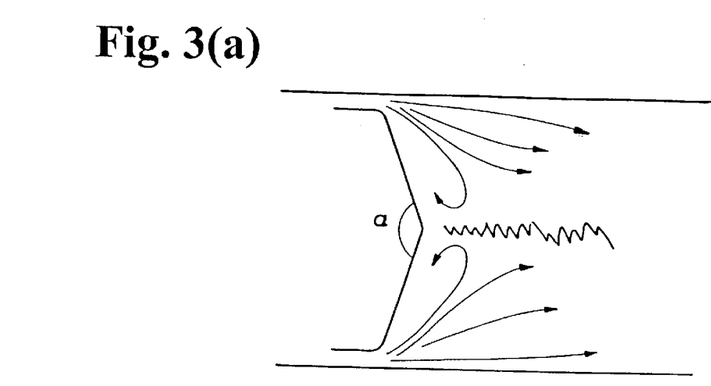
Figure 3B:
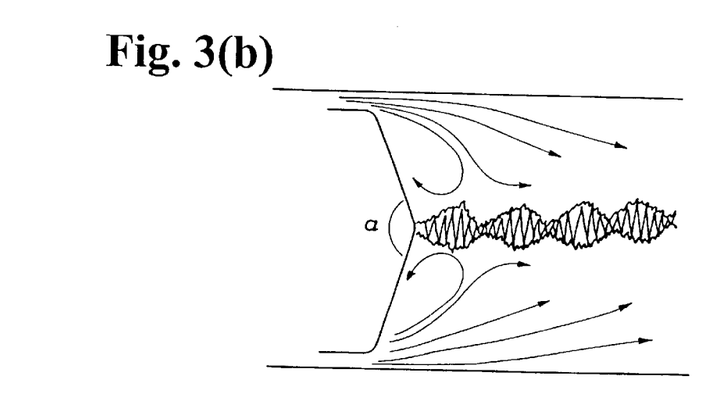
Figure 3C:
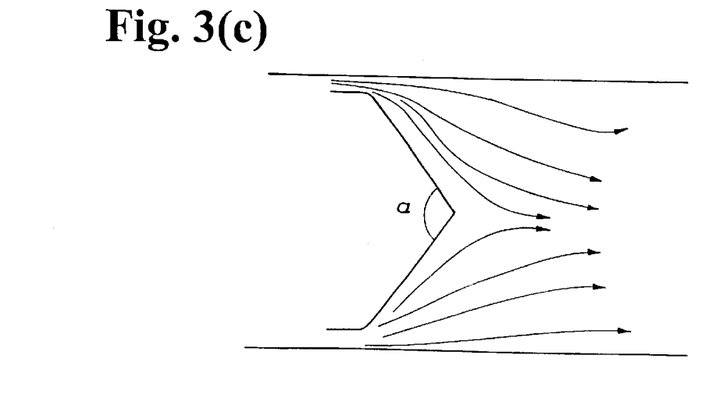
FIG. 3(c) is a schematic diagram showing the raw material condition in a straight flow occurring when a screw having a tip angle smaller than 120 degrees is used.

With regard to the tip section 52 of the screw 50 (or the tip of a screw cap if one is used), the tip angle $\alpha$ as represented in FIG. 3 is selected from an approximate range from 30 to 120 degrees depending on the raw material to be molded. Setting the tip angle for the screw 50 within an approximate range from 30 to 120 degrees ensures feeding of the raw material from the tip of the screw 50 towards the breaker plate 60 (die) in a straight flow.

The above consideration is required from the fact that there are wide differences in the fluidity of plastic materials or that of composite materials comprising plastic and non-plastic materials.

For instance, when molding a standard raw material having a low viscosity and relatively good fluidity using a machine equipped with a screw in which the tip angle α is the standard 160 degrees, while the flow of the raw material becomes somewhat slow around the central axis in front of the screw tip, the low viscosity of the material helps keep the flow from becoming stagnant, enabling a satisfactory molding even though there may be a slight tendency of oxidation (see illustration in FIG. 3(a)).

However, when molding a plastic material or a mixture of plastic and non-plastic materials having an unsatisfactory fluidity with a machine using a screw 50 with the tip angle α of 160 degrees, the flow of the raw material around the central axis in front of the screw tip becomes stagnant, causing an oxidative burn or cavitation as a result. Consequently, it becomes impossible to perform a normal molding operation (see illustration in FIG. 3(b)).

On the other hand, even when the molding operation is provided for a plastic material or a mixture of plastic and non-plastic materials having an unsatisfactory fluidity, selecting the tip angle α of the screw 50 at about 120 degrees or less ensures the feeding of the raw material under straight flow conditions (so-called plug flow), as the material is guided along the tip of the screw 50, thereby enabling to almost completely eliminate the undesirable phenomena mentioned in the above.

It is noted here that, while selecting a tip section 52 of the screw 50 with an angle smaller than 30 degrees might increase the above-mentioned effect, it could make the size of the spade 55 unnecessarily large.

The specific value for the tip angle α of the screw 50 is determined accordingly with the material and conditions for the intended molding operation.

Next, one embodiment of the method for molding plastics and other materials according to the present invention is described in detail referring to FIG. 1.

The raw material comprising a plastic material or a mixture of plastic and non-plastic materials is supplied from the raw material feeder 13 to the hopper 10 via two sub-hoppers 11a and 11b. In the present embodiment, the raw material is fed alternately from the sub-hoppers 11a and 11b by controlling and switching the ball valves 12a and 12b, and ball valves 14a and 14b, for the respective sub-hoppers.

The above-mentioned method of supplying the raw material helps minimize the entrance of air into the hopper 10, while enabling a continuous feeding of the material. Consequently, the quantity of the raw material and the vacuum inside the hopper 10 are maintained roughly at constant levels.

In addition to the above, air inside the hopper 10 is removed through the suction tube 15 connected to the hopper 10.

The raw material in the hopper 10 is sent to the connecting tube 30 by the rotation of the valve unit 22 inside the rotary valve 20, a constant quantity being sent with each rotating movement, and then to the opening 41 of the cylinder 40 through the connecting tube 30. Meanwhile, moisture or gaseous substances such as air are removed from the raw material as they are drawn through primary suction holes 31 provided at the connecting tube 30, while the raw material falls through the path from the outlet of the rotary valve 20 via the connecting tube 30 to the opening 41 of the cylinder 40.

In the above arrangement, in the section where the hopper 10 connects to the rotary valve 20, the raw material is attracted from the former to the latter because of the suction effect from the primary and secondary suction holes 31 and 42. Consequently, a constant quantity of the raw material is sent into the pocket 22a of the valve unit 22 regardless of the quantity of the raw material remaining in the hopper 10, thereby performing a certain measuring function.

In this event, it is obvious that if the quantity of the raw material remaining in the hopper 10 is maintained roughly at a constant level, the quantity of the raw material falling from the hopper 10 to the pocket 22a becomes more consistent to enable a more accurate supply of the raw material to the cylinder.

The suction force at the primary suction holes 31 is preferably set from 400 mmHg to 700 mmHg, depending on the type of raw materials. Setting the suction force within the above range enables satisfactory deaeration of the raw material while preventing the raw material from escaping through the filter element 32.

In addition, it is desirable to set the suction force at the primary suction holes 31 at a level equal to or higher than the suction force at the suction tube 15 provided on the hopper 10 and, at the same time, at a level lower than that at the secondary suction holes 42, for which detailed explanation will be given later.

The above setting is required because if the suction force at the primary suction holes 31 is weaker than that at the suction tube 15, it can hinder the smooth supply of the raw material from the hopper 10 to the connecting tube 30. By the same token, if the suction force at the primary suction holes 31 is stronger than that at the secondary suction holes 42, it can attract the raw material towards the area of the primary suction holes 31 to prevent a smooth flow into the cylinder 40, and eventually to clog the connecting tube 30 with the raw material staying inside.

It is noted here that, although there is a slight inflow of air at the rotary valve 20 from the bearing section that is not shown in the drawing, it does not adversely affect the arrangement as the leakage is negligibly small compared with the degree of deaeration provided. On the contrary, the inflow of air from the bearing into the rotary valve 20 acts to prevent ingress of the raw material into the bearing, thereby eliminating the so-called bite of the raw material at the bearing to ensure smooth rotations of the bearing and therefore a steady feed of the material by the rotary valve 20.

The raw material thus deaerated as described above is then fed from the opening 41 into the cylinder 40 wherein another suction is provided at the secondary suction holes 42. As described previously, the suction force at the secondary suction holes 42 is required to be stronger than that of the primary suction holes 31 and, more specifically, to be set between 500 mmHg and 760 mmHg depending on the material.

The above suction is provided at the bottom side of the cylinder 40 opposing the opening 41, more specifically, within a circumferential range of roughly 60 to 120 degrees at the bottom section of the cylinder 40 to amass the raw material inside the cylinder 40 around this area.

Setting the suction force and the position for the secondary suction holes 42 as described above enables a stable and ample supply of the raw material into the cylinder 40. Also, by setting the suction forces at the primary suction holes 31 and the secondary suction holes 42 as well as the pressure difference between them in the manner as described above, the raw material is prevented from flowing out to outside of the cylinder 40 together with air as deaeration is performed at the secondary suction holes 42.

The application of suction force at the secondary suction holes 42 provides the raw material inside the cylinder 40 with further deaeration to increase its bulk density, while at the same time bringing the system to oxygen-free conditions.

In the above arrangement, an improved deaeration effect can be obtained if sub-hoppers 11a and 11b as shown in FIG. 1 are installed on top of the hopper 10 to place the hopper 10 under a sealed condition, or the length of the connecting tube 30 between the hopper 10 and the opening of the cylinder 40 is increased. In these arrangements, it is likely that the raw material will cause a clogging at the hopper 10 and/or in the connecting tube 30 if a suction force is not applied at least from the secondary suction holes 42. In other words, the above-mentioned techniques can be considered effective when the suction force is applied from the secondary suction holes 42.

Accordingly, while measures such as arranging the sub-hoppers 11a and 11b, or making the connecting tube 30 longer can help improve the effectiveness of the deaeration, they can be dispensed with depending on the molding conditions, types of raw materials, and other factors.

In an additional function of the present embodiment, the suction from the secondary suction holes 42 causes a part of the heat within the cylinder 40 to flow back to the vicinity of the opening 41 of the cylinder 40, to expedite melting of the raw material fed from the opening 41 into the cylinder 40.

Furthermore, the suction from the secondary suction holes 42 causes a part of the raw material within the cylinder 40 to be drawn back to increase the bulk density of the material in the vicinity of the opening 41 of the cylinder 40. When such a raw material having higher bulk density is pushed by the screw 50 from nearby the opening 41 towards the front side of the cylinder 40 a strong shearing force works on the denser material to generate frictional heat.

Thus, the suction provided at the secondary suction holes 42 acts to start heating of the raw material having higher bulk density in the vicinity of the opening 41 of the cylinder 40 with the heat flowing back from the forward section of the cylinder 40 as well as with the frictional heat generated by the increased bulk density of the raw material.

Consequently, with the aforementioned method, a sufficient degree of pre-heating can be provided to the raw material in the vicinity of the opening of the cylinder 40 or in the first zone C1 as shown in FIG. 1 to initiate melting of the material at a relatively early stage.

The raw material for which heating and/or melting actions are initiated in the first zone C1 in the cylinder 40 is sent to the second zone C2, where the material is almost completely melted with a further compression, and thereafter is given a sufficient amount of kneading in the third zone C3 to homogenize the material.

Since the raw material is heated under oxygen-free conditions throughout the above process, the raw material receives little oxidative effect and therefore scarcely present defects such as a "burn".

Moreover, the increased bulk density in the vicinity of the opening 41 due to the suction provided at the secondary suction holes 42 and the resultant frictional heat generated by the shearing force, together with the heat flowing back from the forward section of the cylinder 40, enables a heating of the raw material to be started immediately and at a higher temperature.

Consequently, there is no need to furnish the molding machine with a long pre-heating zone as in the prior art, thereby enabling a shorter over-all length of the molding machine (a reduction by 20% or so is possible), and a shorter time duration for the raw material to be exposed under heat.

As described in the above, since the melting and kneading can be performed quickly with a shorter molding machine (i.e. with a shorter processing distance), it enables a screw designed with a shorter length and also a space to be provided in the head section of a molding machine, making it possible to prevent thermal degradation of the raw material as well as wear on the screw tip.

While the degree of wear on the screw is most severe at its tip where it receives the largest frictional force, since the method for molding in the present invention provides for the raw material feeding from the screw tip toward the cylinder head section to be performed in straight flow conditions and also with a reduced shearing force, it reduces friction with the raw material and, accordingly, reduces wear at the screw tip material as well.

The raw material thus thoroughly melt and kneaded as described above is then sent to the fourth zone C4 in front of the screw tip, where the shearing force to the material is reduced and the temperature is lowered, before it is extruded out from the breaker plate 60 (die).

In the above arrangement, since the angle α of the tip section 52 of the screw 50 is set within a range between 30 degrees and 120 degrees, the raw material is fed towards the breaker plate 60 (die) in straight flow conditions without being trapped in a swirl generated around the screw tip or causing a turbulent flow, as shown in FIG. 3(c).

The molding methods described in the foregoing can be satisfactorily implemented in applications with a raw material containing as much as 30 to 80% by weight of powder form, non-plastic materials in it, not to mention those with less than 30% of such materials. Specifically, molded products with satisfactory quality have been obtained with a non-plastic material content at 30 to 80% by weight in the case of wood flour and paper powders, 20 to 80% by weight for stone powders, and 5 to 80% by weight for metal powders.

It should be noted here that the molding methods and equipment of the present invention are not limited to the embodiments presented in the foregoing and that various changes or variations may be made without departing from the spirit and scope of the invention. For example, the present invention can be applied not only to extrusion molding but also to other plastic forming processes such as injection molding, or also as a pelletizer to prepare pellets of raw materials. In particular, the ability of the present invention to perform a pelletizing operation at a low temperature is an important feature as it makes the postforming extremely easy.

EXAMPLES

In the following, one embodiment example of the present invention is compared with a prior art comparative example.

[EXAMPLE]

Figure 5:
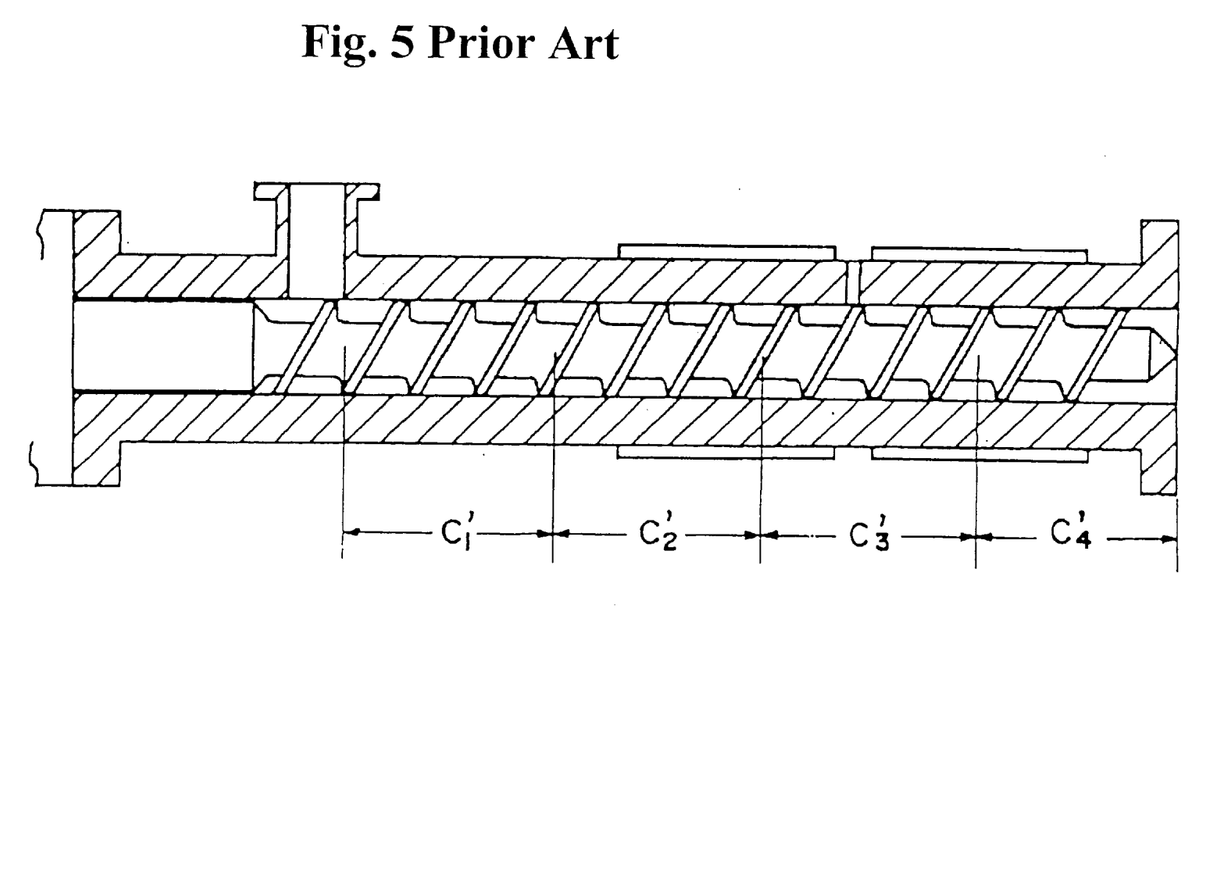
FIG. 5 shows a side view section of the cylinder section of a molding machine in the prior art.

<Molding conditions>
(1) Uniaxial extrusion machine (an extruder with a 65 mm diameter)
  Cylinder length (L)/Screw length (D)=25/23.5 Screw rotation at 40 rpm (2) Suction forces:
  Suction at primary suction holes: 500 mmHg
  Suction at secondary suction holes: 650 mmHg
(3) Raw materials:
  Polyvinyl chloride as plastic material: 50% by weight
  Wood flour as non-plastic material: 50% by weight
(4) Process time: 80 hours
<Results>
The heating of the raw material started in the vicinity of the cylinder opening, and a uniform material thoroughly melt-kneaded and having a wood-like appearance was extruded without any burn or cavitation.
Extrusion rate: 81 kg/Hr
Evaluation: Smooth surface, no burn, genuine wood-like appearance, good moldability Conventional Example
<Molding conditions>
(1) Uniaxial extrusion machine (an extruder shown in FIG. 4, with a 65 mm diameter)
  Cylinder length (L)/Screw length (D)=25/25
  Screw rotation at 20 rpm
(2) No deaeration was provided on the raw material.
(3) Raw materials:
  Polyvinyl chloride as plastic material: 70% by weight
  Wood flour as non-plastic material: 30% by weight
(4) Process time: 8 hours
<Results>
In reference to FIG. 5 illustrating a conventional extruder, the raw material was transferred in the section denoted with C1', compressed in the C2' section, and melted in the C3' and C4' sections. Burnt materials started to contaminate the product as the process time elapsed to necessitate stoppage and an overhaul servicing on the molding machine.
Extrusion rate: 25 kg/Hr
Evaluation: The raw material was excessively kneaded and yielded a product with cavities in it as well as burn marks on the surface which was rough, failing to present a genuine wood-like appearance.

The method for molding plastics and other materials according to the present invention enables a molding operation on raw materials having poor fluidity or thermal stability to yield material with thoroughly melt-kneaded and uniform quality to result in exceedingly superior molded products without burn or cavitation therein, with high efficiency and within a short processing time. Consequently, the method allows stable operation of a molding machine for a longer duration to substantially increase productivity.

Further, in accordance with the molding equipment of the present invention, molding of materials with poor fluidity or thermal stability, which have been regarded as difficult-to-mold materials in the prior art, can be made possible with a simple and compact equipment.

Furthermore, even if the raw material is a plastic material with relatively good fluidity, when a product having a fine shape such as filaments for textile or a thin form such as film is molded, air, volatile substance, or moisture contained in the raw material evaporates and ruptures when the material leaves the die lip, leaving a decomposed contaminant that is so-called "eye wax" at the die lip. When such a contaminant deposits on the die lip, quality defects such as a rough product surface, streaks, transparency failures, or a filament discontinuation develop to eventually lead to a lowered productivity.

According to the present invention, even when products having a fine shape such as filaments for textile or a thin form such as films are molded with a raw material comprising a plastic material with relatively good fluidity, by providing the plastic material with melt-kneading under oxygen-free conditions within the extruder cylinder, and also by feeding the molten material from the screw tip to the head section of said cylinder in a straight flow, good quality products can be molded with a high productivity while avoiding problems such as "eye wax" described above.

Industrial Applicability

In accordance with the equipment for molding plastics and other materials of the present invention, satisfactory molding is made possible for plastics having poor fluidity or thermal stability, or for raw materials comprising plastic materials mixed with non-plastic materials such as wood flour, paper powders, stone powders, metal powders, fiber reinforcements and the like. The present invention, therefore, can be applied for example to molding of pipes, sheets, filaments, preforms, packaging materials, optical fibers, wire coating, construction materials, automobile interior fittings, exterior and interior fittings for home electronic appliances, and the like.

What is claimed is:

1. A method for molding plastics and other materials, comprising:
  supplying a raw material to a hermetically sealed hopper alternately from a plurality of sub-hoppers,
  providing said raw material in the hopper to a cylinder through an opening of the cylinder,
  removing air inside the cylinder at an area in the cylinder near the opening thereof through at least one air suction hole of the cylinder to thereby remove air from the raw material and bring the raw material in an oxygen-free condition so that the raw material in the cylinder is drawn near the opening in the cylinder to increase bulk density of the raw material near the opening, and
  rotating a screw disposed in the cylinder to provide a shearing force to the raw material with the increased bulk density to thereby generate frictional heat to melt-knead the raw material, said frictional heat being allowed to flow back to the area near the opening by removal of air so that melting of the raw material is started from the-area near the opening.

2. The method for molding plastics and other materials according to claim 1, wherein a suction force at the path from said valve to said cylinder is in the range from 400 to 700 mmHg and a suction force within said cylinder is in a range from 500 to 760 mmHg.

3. The method for molding plastics and other materials according to claim 1, wherein the screw is located in the cylinder such that a ratio of a length of the cylinder to a length of the screw is 1 to 0.98–0.75 to form a space at a tip of the cylinder, said raw material being sent from a tip of said screw towards a head section of said cylinder under a straight flow condition.

4. The method for molding plastics and other materials according to claim 3, wherein the shearing force working on a molten raw material is reduced when said material is sent from the tip of said screw towards the head section of said cylinder.

5. The method for molding plastics and other materials according to claim 1, wherein the raw material comprises a mixture of 20 to 90% by weight of plastic material and 10 to 80% by weight of non-plastic material.

6. The method for molding plastics and other materials according to claim 1, wherein the raw material comprising plastic materials in either pellet or powder form and non-plastic in powder form materials are fed from the hopper into the cylinder.

7. The method for molding plastics and other materials according to claim 1, wherein said raw material is supplied to the cylinder from the hopper through a connecting tube, a valve and the opening, air being initially removed from said raw material at a path from the valve to the cylinder at a pressure equal to or less than that inside the cylinder.

8. The method for molding plastic and other materials according to claim 1, wherein said at least one air suction hole is a hollow shaped suction hole formed across a predetermined circumferential range and one hole communicating with the hollow shaped suction hole.

9. The method for molding plastic and other materials according to claim 8, wherein a filter is situated in the hollow shaped suction hole.

10. The method for molding plastics and other materials according to claim 1, wherein said at least one air suction hole includes a plurality of holes formed at the circumferenctial range of 60 to 120 (degrees..

11. The method for molding plastics and other materials according to claim 1, wherein said sub-hoppers are sealed.

12. The method for molding plastics and other materials according to claim 11, wherein the air inside the cylinder is removed through the at least one air suction hole located within a circumferential range of 60 to 120 degrees at a bottom section of the cylinder.

13. A method for molding plastic and other materials, comprising:

supplying a raw material including a plastic material or a mixture of a plastic and non-plastic material to a hermetically sealed hopper alternately from a plurality of sub-hoppers, providing the raw material from the hopper to a cylinder through a path including a valve, a connecting tube and a cylinder opening, removing air from the raw material in the path from the valve to the cylinder, removing air further from the raw material at an area in the cylinder near the cylinder opening at a suction pressure at least equal to a pressure for removing the air in the path from the valve to the cylinder so that the raw material is brought to an oxygen-free condition, and rotating a screw disposed in the cylinder to provide a shearing force to the raw material to thereby generate frictional heat to melt-knead the raw material, said frictional heat being allowed to flow back to the area near the opening by removal of air so that the melting of the raw material is started from the area near the opening.

14. The method for molding plastics and other materials according to claim 13, wherein said sub-hoppers are sealed.

* * * * *